Oct. 20, 1931.   L. E. POOLE ET AL   1,828,441
APPARATUS FOR MAKING COMMUTATORS
Filed May 18, 1929   6 Sheets-Sheet 1
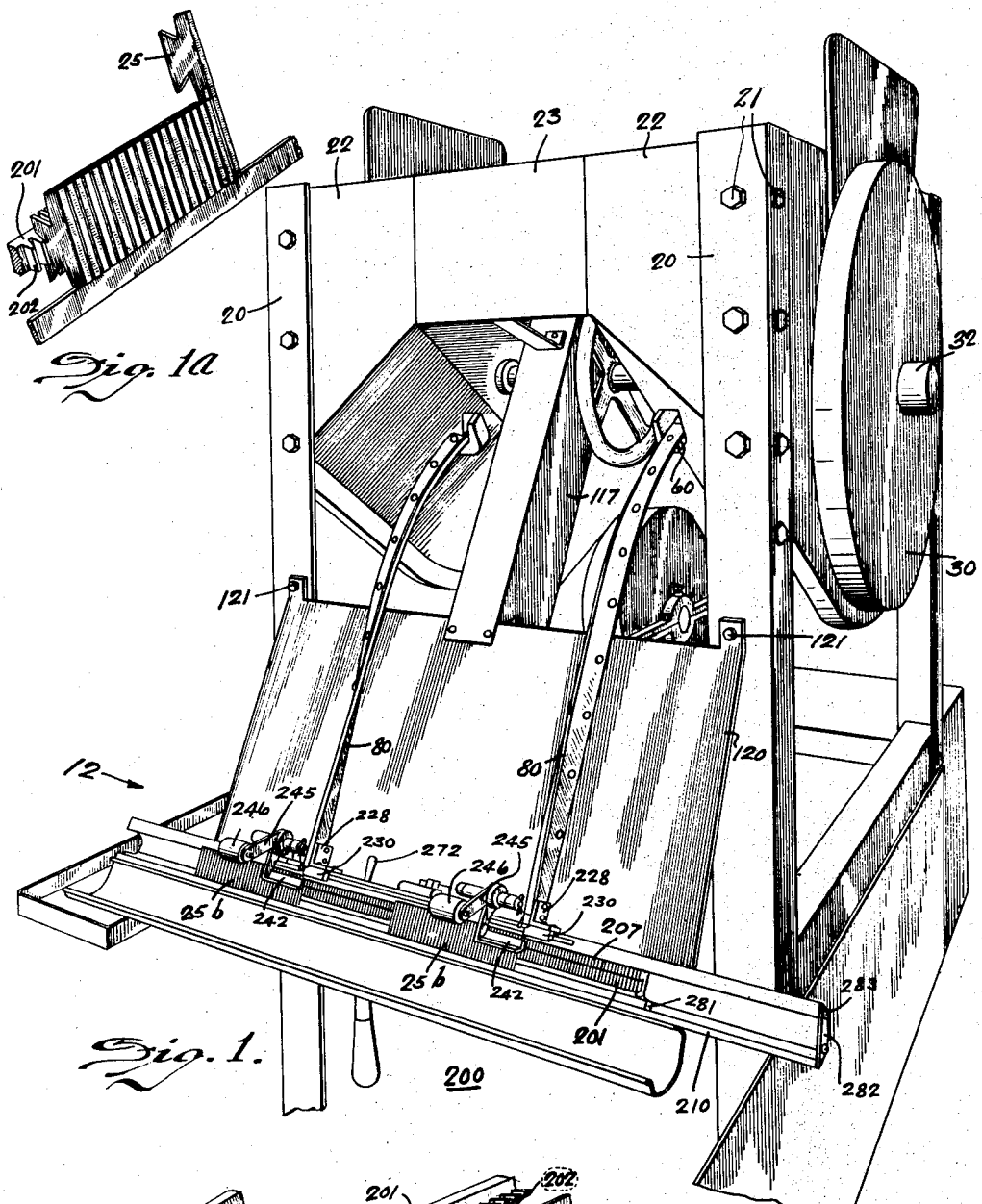
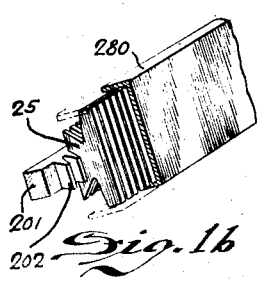

Oct. 20, 1931.    L. E. POOLE ET AL    1,828,441
APPARATUS FOR MAKING COMMUTATORS
Filed May 18, 1929    6 Sheets-Sheet 4
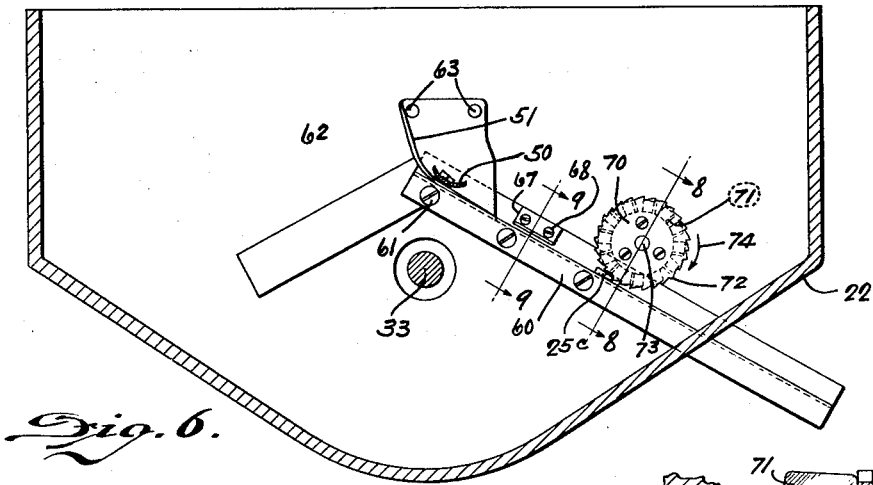
Fig. 6.
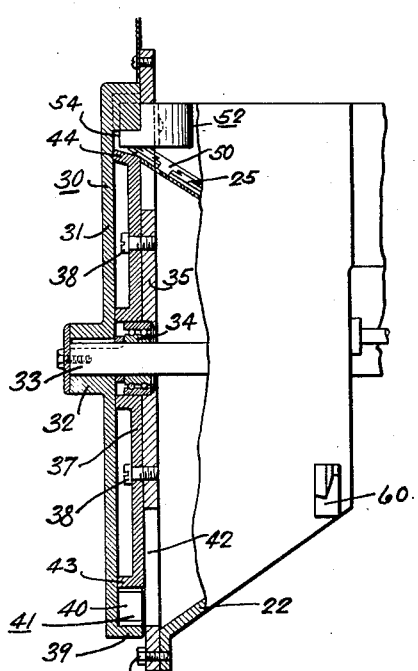
Fig. 7.
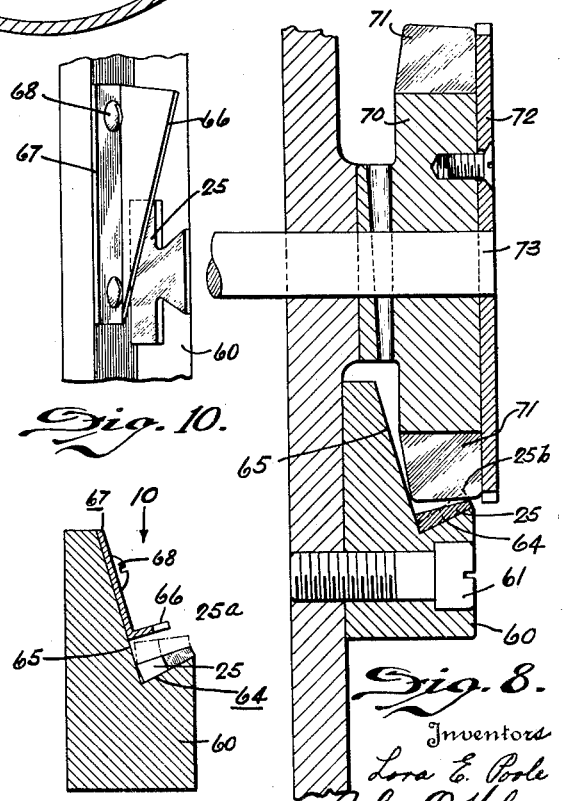
Fig. 10.
Fig. 9.
Fig. 8.
Inventors
Lora E. Poole
John Q. Holmes
and Louis C. Goad
By Spencer Hardman & Fehr
their Attorneys

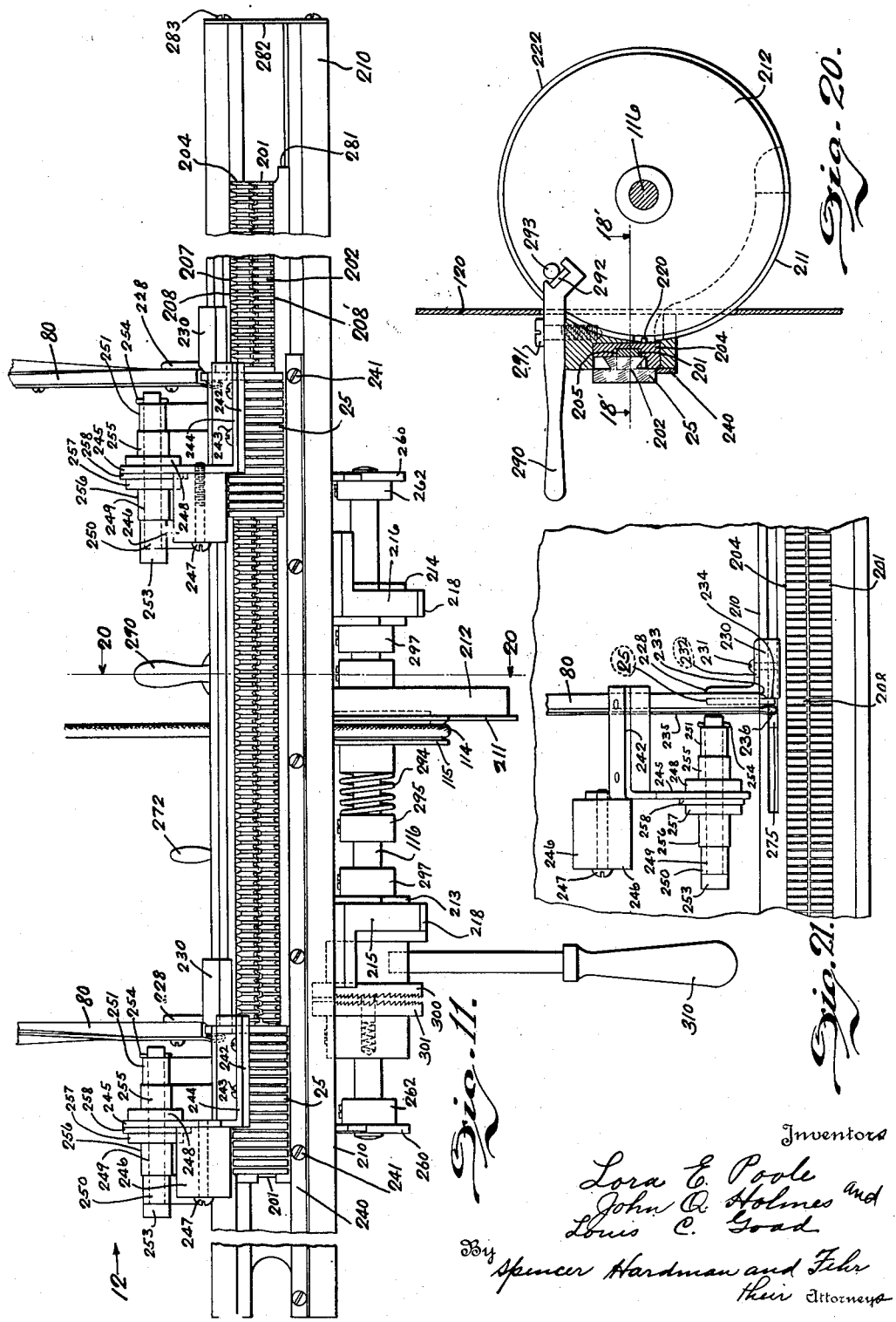

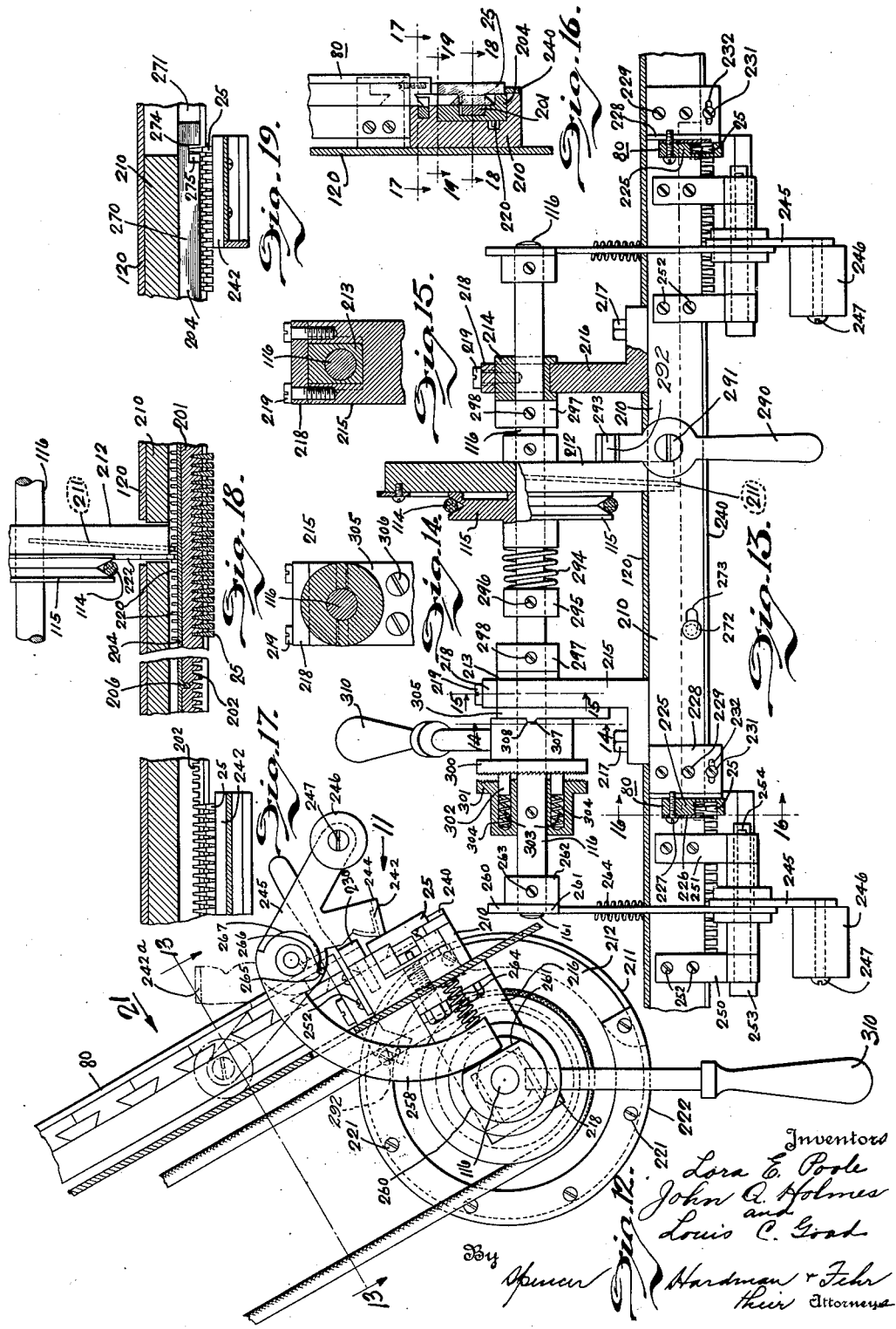

Patented Oct. 20, 1931

1,828,441

UNITED STATES PATENT OFFICE

LORA E. POOLE AND JOHN Q. HOLMES, OF ANDERSON, AND LOUIS C. GOAD, OF MUNCIE, INDIANA, ASSIGNORS TO DELCO-REMY CORPORATION, OF ANDERSON, INDIANA, A CORPORATION OF DELAWARE

APPARATUS FOR MAKING COMMUTATORS

Application filed May 18, 1929. Serial No. 364,154.

This invention relates to the manufacture of devices from a number of bars of material the transverse sectional thickness of which is variable. One example of such device is a commutator for a dynamo electric machine, and particularly a commutator having segments which are wedge-shaped in cross section.

One object of the present invention is to provide a machine for automatically feeding bars such as wedge-shaped commutator segments in predetermined regular arrangement from a hopper in which the segments are arranged promiscuously, and for causing the segments to be arranged in orderly side-to-side relation. One use of the present invention is to supply the commutator segment magazine of a commutator assembling machine, such as shown for example, in the co-pending application of Lora E. Poole, Serial No. 183,080, filed April 12, 1927.

Further objects and advantages of the present invention will be apparent from the following description, reference being had to the accompanying drawings, wherein a preferred embodiment of one form of the present invention is clearly shown.

In the drawings:

Fig. 1 is a perspective exterior view of a hopper feed mechanism embodying the present invention, and an associated mechanism which receives segments from the hopper feed and assembles them upon a segment rack from which the commutator segments are removed one at a time in a commutator assembling machine, such as disclosed in the Poole application referred to.

Fig. 1a is a diagrammatic perspective view indicating the method of stacking the segment rack.

Fig. 1b is a diagrammatic perspective view indicating the segment rack pan in position before removing the filled rack from the rack stacker.

Fig. 1c is a diagrammatic perspective view indicating the filled segment rack located upon the pan after removal from the stacker.

Fig. 6 is a sectional view on the line 6—6 of Fig. 4.

Fig. 7 is a sectional view on the line 7—7 of Fig. 5.

Fig. 8 is a full scale sectional view on the line 8—8 of Fig. 6.

Fig. 9 is a full scale sectional view on the line 9—9 of Fig. 6.

Fig. 10 is a fragmentary, plan view of that portion of the apparatus shown in Fig. 9, looking in the direction of the arrow 10.

Fig. 11 is a fragmentary, front view of the rack assembling mechanism shown in Fig. 1, and is a view looking in the direction of the arrow 11 of Fig. 12 shown on the following sheet.

Fig. 12 is an end view looking in the direction of the arrows 12 shown in Figs. 1 and 11.

Fig. 13 is a fragmentary view, partly in section, the section being taken on the line 13—13 of Fig. 12.

Figure 2:
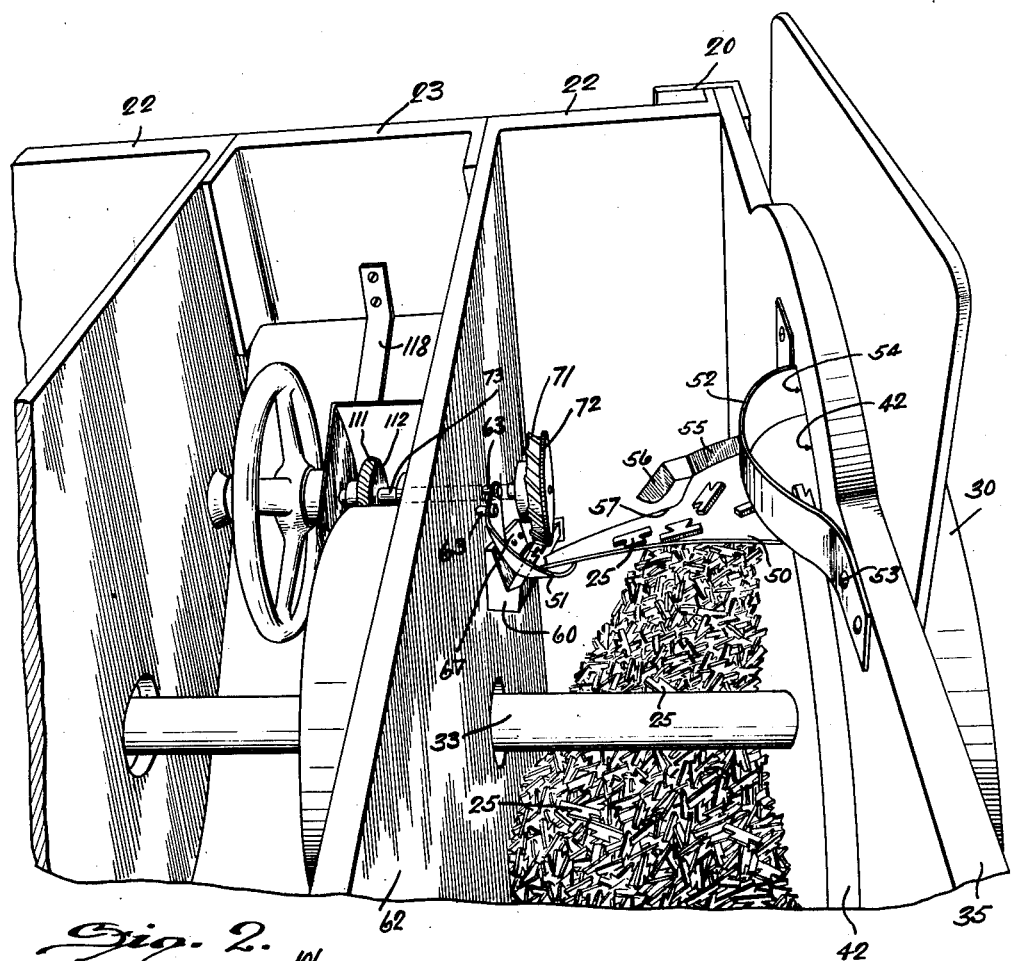
Fig. 2 is a fragmentary, perspective view looking down into one of the hoppers and shows segments which have been elevated from the bottom of the hopper and which appear sliding down a chute which causes them to slide endwise rather than sidewise, and which also shows a gate mechanism which permits the segments to pass only when they are presented to the gate in a predetermined manner.

Figs. 14 and 15 are sectional views taken, respectively, on lines 14—14 and 15—15 of Fig. 13.

Fig. 16 is a sectional view taken on the line 16—16 of Fig. 13.

Figs. 17, 18 and 19 are fragmentary, sectional views, taken on the lines 17—17, 18—18 and 19—19 of Fig. 16. Fig. 18 is a sectional view taken on the line 18'—18' of Fig. 20 shown on the preceding sheet.

Fig. 20 is a sectional view on the line 20—20 of Fig. 11.

Fig. 21 is a fragmentary view looking in the direction of the arrow 21 in Fig. 12 and shows the packing device in non-operating position.

Hopper feed mechanism

Referring to Fig. 1, numerals 20 designate supporting posts or upright angle bars to which are secured, by screws 21, a pair of hoppers 22 which are secured together in spaced relation by a pair of channel bars 23 attached by screws 24. Since the hoppers and feeding mechanism, associated with each, are duplicates, only one feeding mechanism will be described.

The mechanism comprises chiefly means for elevating segments from the bottom of the hopper to a location near the top thereof, a chute which receives segments from the elevating means and which permits the segments to pass by gravity to a lower level during which the segments are caused to slide for the most part finally endwise, and a gate mechanism which permits the segments to pass only when they are presented in a predetermined relation to the gate and which removes from the chute the segments which will not pass the gate.

Figure 4:
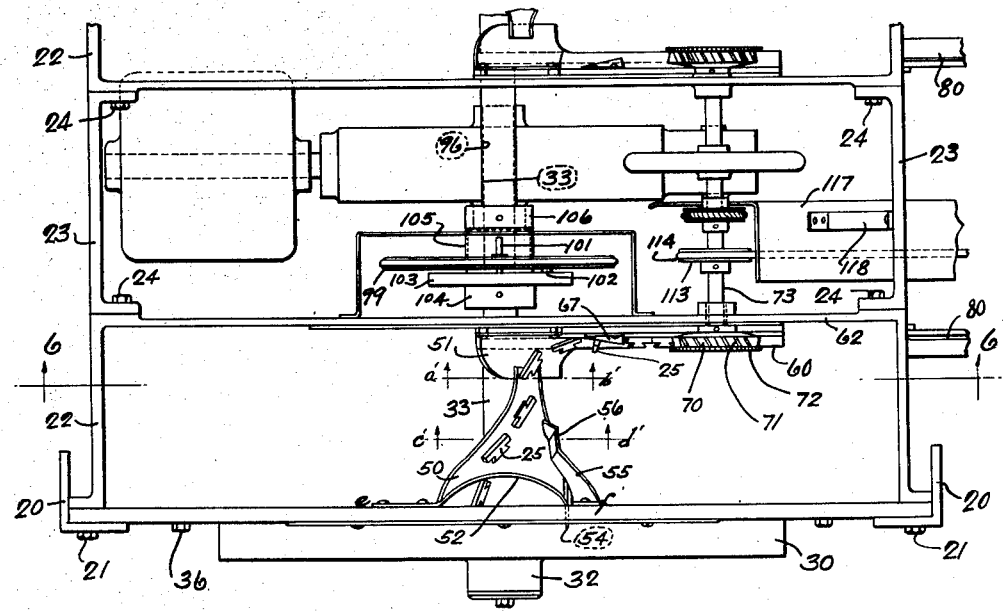
Fig. 4 is a fragmentary plan view.
Figure 5:
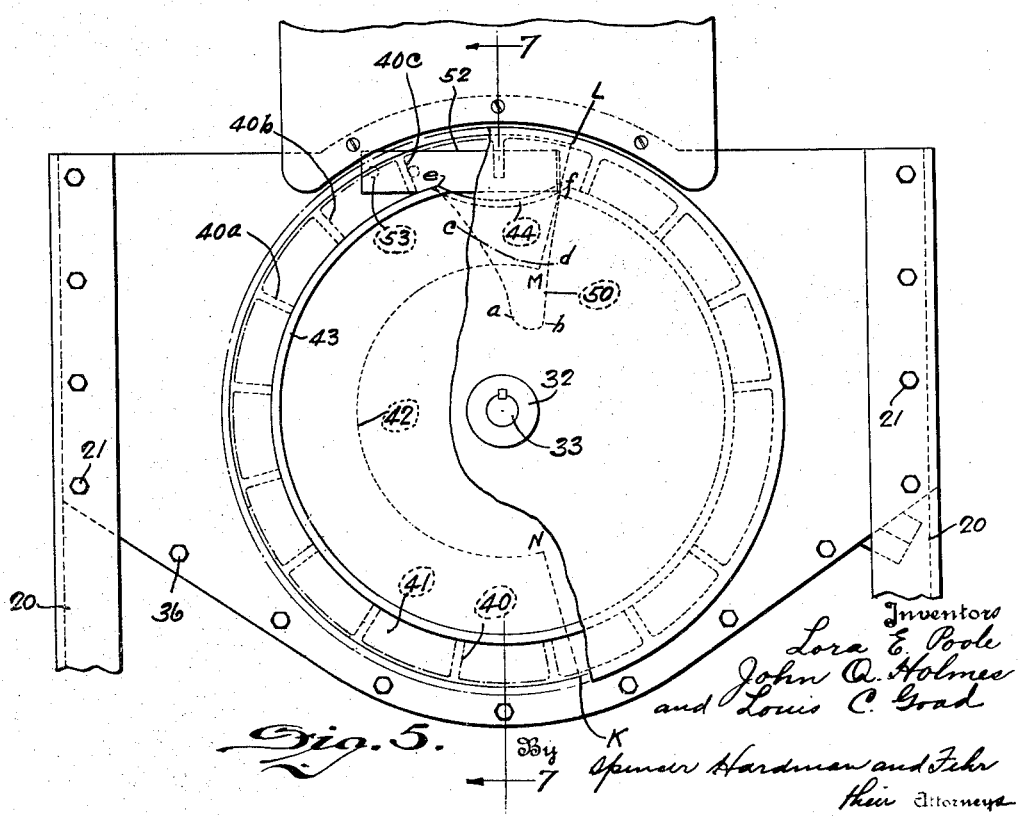
Fig. 5 is a fragmentary, side view partly broken away.

The elevating mechanism comprises a rotatable bucket wheel 30 which includes a web 31 merging with a hub 32 mounted upon a drive shaft 33 which is supported in a bearing 34 mounted in a suitable recess in an end cover 35 attached to the hopper 22 by screws 21 and 36, and in a suitable recess provided by a plate 37 attached by screws 38 to the hopper end wall 35. The web of the wheel 30 merges with an annular flange 39. A plurality of vanes 40 extend from the web 31 and the flange 39 and provide buckets or pockets 41 for receiving segments indicated by numeral 25 in the bottom of the hopper as shown in Fig. 2. The segments may pass through an arcuate opening 42 in the hopper side wall 35 when passing into the buckets 41. The shape of this opening 42 is shown particularly in Fig. 5 and is bounded by the concentric arcuate line KL and MN joined by the radial lines LM and NK. The plate 37 is provided with a flange 43 which prevents the segments dropping from the buckets when the vanes move into the position indicated at 40a, 40b and 40c, the direction of rotation being clockwise as viewed in Fig. 5. The flange 43 of the plate 37 merges above the shaft 33 with a dished flange 44 indicated by the curved line ef in Fig. 5. As the pockets 41 move into a position nearly vertically above near the shaft 33, the segments therein fall upon the flange 44 and upon a chute 50 which permits the segments 25 to slide downwardly upon a plate 51 which is curved in both directions in order to direct the movements of the segments into a direction which is transverse to the direction of movement of the segments as they move along the chute 50. In order to be sure that the pockets are empty upon the chute 50 there is provided a scraper 52 attached by rivets 53 to the end plate 35 and bent so that its free end 54 extends into the opening 42 and hence into the pockets 41. The elevator is of such size that there will be a great surplus of segments deposited upon the chute 50. The contours of the chute at different vertical cutting planes parallel to the end cover 35 are represented by lines ab, cd and ef in Fig. 5 denoting the cross sectional contours at lines a'b', c'd' and e'f' respectively in Fig. 4. The portion of the chute 50 adjacent the upper end near the opening 42 is large enough to accommodate most of the segments which are deposited upon the chute, but the lower end of the chute is relatively narrow in order that only the segments which slide endwise will be retained upon the chute 50. It will be noted from Fig. 2 that the upper portion of the chute 50 is provided with a flange 55 which terminates in a finger 56 approximately where the chute 50 abruptly narrows down as indicated by numeral 57 in Fig. 2. The purpose of the flange 55 is to confine a large number of segments upon the chute 50 at the upper end thereof so as to increase the possibility of having a sufficient number of segments which will move endwise along the chute rather than sidewise. The flange 55 terminates in the fingers 56 so as to permit those segments which tend to slide laterally to drop from the chute. The curved plate 51 directs the segments upon a second chute or shelf bar 60 attached by screws 61 to the side wall 62 of the hopper 22. The wall 62 also receives the screws 63 which support the plate 51. The chute 60 provides an inclined surface 64 which receives the commutator segments 25 which slide endwise down the chute 60. The wider edge of the segment bears against an inclined surface 65. If the segments do not slide substantially sidewise down the chute 60, they will engage with a flange 66 of an ejector plate 67 attached by screws 68 to the chute bar 60. The flange 66 is spaced from the surface 64 at such a distance that two superposed segments might slide down the surface 64, the upper segment being represented by the dot and dash lines 25a, in Fig. 9. After passing the ejector plate 67, the segments pass through a gate which consists of a rotating wheel 70 provided with a plurality of curved vanes or paddles 71 and a toothed disc 72. The wheel 70 is mounted upon a shaft 73 and rotates in a clockwise direction as indicated by arrows 74 in Fig. 6. The paddles 71 are so spaced from the surface 64, as shown in Fig. 6, that a segment will pass the gate wheel 70 only when the segment slides with its broader edge against the chute surface 65. In case the segment slides with its broader edge remote from the surface 65 as indicated at 25b in dot and dash lines in Fig. 8, that segment will be engaged by a paddle 71 and will be thrown slantingly upward and thus ejected from the chute 60. In case a segment should slide down the chute sidewise instead of endwise as indicated at 25c in Fig. 6, the toothed disc 72 will engage that segment and eject it from the chute.

It is therefore apparent that the segments which pass the gate wheel 70 when sliding down the chute 60, are only those segments which slide endwise and which are arranged in a predetermined order, namely, with their wider edges against the chute surface 65. Consequently, the segments which pass from the ends of the chute 60, as viewed in Fig. 1, all pass in orderly end-to-end relation. After the segments pass the chute 60 they are conducted through tubular conduits of somewhat rectangular cross section 80 which make a quarter turn in going from the distance from the ends of the chute 60 to the rack stacking mechanism 200, shown in Fig. 1, and to be described later. For present purposes it is sufficient to say that the packing mechanism 200 receives the segments which pass down the conduits 80 and causes the segments to be arranged in orderly side-to-side fashion upon a removable rack bar 201 which can be removed from the segment stacker and carried when filled with segments as indicated at 25b in Fig. 1, to a commutator assembly machine, such as shown in Poole's application, No. 183,080.

Figure 3:
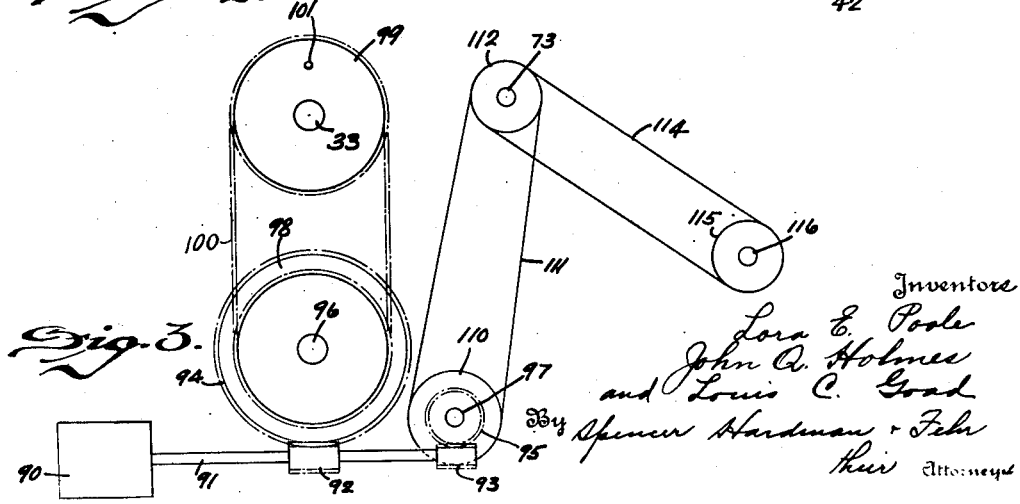
Fig. 3 is a diagrammatic view of the mechanism for driving the hopper feed and mechanism associated therewith.

The mechanism for operating the shafts 33 and 73 will now be described with particular reference to Fig. 3. The posts 20 support a suitable platform which carries a driving motor 90 operating a shaft 91 which carries worm wheels 92 and 93 meshing with worm gears 94 and 95 respectively, attached to shafts 96 and 97 respectively. The shaft 96 drives a sprocket wheel 98 connected with a sprocket wheel 99 by a sprocket chain 100. The wheel 99 is mounted loosely on shaft 33 and carries a shear pin 101 adapted to drivingly engage a lug 102 provided by a disc 103 having a hub 104 pinned to the shaft 33. The hub 105 of the sprocket wheel 99 is confined between the disc 103 and a collar 106 also pinned to the shaft 33. If, due to a jamming of segments in the elevator wheel 30, or for any other reason, the torque required to turn the shaft 33 becomes excessive, the pin 101 will be sheared off adjacent the lug 102, then the transmission of power from the motor to the shaft 33 will be interrupted, thus protecting the machinery from further injury. The shaft 97 drives a pulley wheel 110 connected by a belt 111 with a pulley wheel 112 attached to a shaft 73. Shaft 73 carries another pulley wheel 113 drivingly connected by a belt 114 with a pulley wheel 115 mounted on a shaft 116 which operates the rack stacker 200 in a manner to be described. The belt 114 is enclosed by a guard 117 attached by a bracket 118 to the channel bar 23 as shown in Fig. 2, and attached at its lower end to an apron 120 which provides a support for the rack stacker 200.

Rack-stacker

As already indicated, the rack-stacker 200 provides for automatically assembling commutator segments 25 in orderly side-by-side relation with a rack 201 which, as shown particularly in Figs. 1a, 1b, 1c, 16 and 18, is a long bar rectangular in cross section, and notched to provide a series of spaced teeth 202 which will hold the commutator segment 25 substantially in parallel equidistant relation. The rack bar 201 is locatable upon a rack carriage 204 and is confined laterally by the walls of a longitudinally extending groove 205 provided by the rack carriage and is confined longitudinally by a locating pin 206 shown in Fig. 18 which is received by a suitable hole in the rack, hence when the rack 201 is placed upon the rack carriage 204 in the manner shown, the carriage and rack will move together as a unit. When the rack and carriage are thus assembled, the teeth of the rack will be in alignment with spaced teeth 207, provided by the carriage as shown particularly in Figs. 1 and 11. Thus when the rack and carriage are assembled as a unit, there will be provided a plurality of segment receiving spaces 208 and 208' which are respectively in vertical alignment.

The rack carriage 204 slides horizontally along a suitable groove provided by a carriage guide frame 210 which is attached to the apron 120 attached by screws 121 to the posts 20. The rack and rack carriage assembly is moved from right to left along the rack guide 210 by an intermittent or step-by-step motion, each step of motion being equal to the spacing of the rack teeth. This intermittent motion is imparted to the rack carriage 204 by a rotatable cam plate 211 mounted upon a drum 212 which is fixed to the operating shaft 116 shown diagrammatically in Fig. 3. The shaft 116 is journalled in bearing blocks 213 and 214 supported by brackets 215 and 216 respectively attached by screws 217 to the frame 210. As shown in Fig. 15, each bearing block is retained by a plate 218 attached by screws 219 to the bearing block bracket. The cam plate 211 is of such thickness that it will pass between any two adjacent pegs 220 which are arranged in a straight row and are attached to the rack carriage 204 as shown particularly in Fig. 18. It will be noted with reference to Fig. 20, that the cam plate 211 is operated during only one quarter turn of the drum 212. During the one quarter turn of the drum 212 in which the cam 211 engages a peg 220 the rack carriage 204 will be moved from right to left as viewed in the drawings a distance equal to the spacing of the rack teeth 202. Referring to Fig. 12, screws 221 secure to the drum 212 a rack carriage retainer plate 222 which is of such width that that portion of the plate 222 which extends outside the periphery of the drum 212 may pass between any two adjacent pegs 220 as shown in Fig. 18. The plate 222 is effective to prevent endwise movement of the rack carriage 204 during three-quarters of a turn of the drum 212, and is obviously effective while the cam 211 is not operating to move the rack carriage.

Each chute 80 comprises a channel bar 225, the channel of which permits a segment 25 to slide freely down the chute, and a retainer plate 226 secured to the bar 225 by screws 227. Each channel bar 225 is secured to the frame 210 by an angle 228 secured by screws 229. The chutes 80 are spaced apart so that their channels will be in vertical alignment with segment receiving spaces 208 of the rack carriage 204 when the carriage is stationary. As the channel bar 225 provides ample clearance for the segment 25, it is desirable to provide for more accurately adjusting the position of the segment as it leaves the chute 80 and passes into the rack carriage 204. This adjustment is provided by a block 230 which is located in contact with the front face of the frame 210 and is retained by a screw 231 passing through an oblong slot 232 in the angle 228. The block is provided with a beveled surface 233 and with a straight surface 234 arranged in a vertical position on the machine. The screw and slot connection between the block 230 and the angle 228 provides for adjusting the guide block 230 so that the segment 25 will be in exact alignment with a segment receiving space 208. The segment 25 is yieldingly urged toward the surface 234 of the guide block 230 by a very light leaf spring member 235 fixed at its upper end to the retainer plate 226 of the chute 80 and having a loop 236, bearing very lightly against the segment 25 as shown in Fig. 21. The pressure exerted by the spring 235 does not interfere with the falling of the segment 25 into the rack carriage and removable rack. As shown in Fig. 12, the segment 25 falls down an inclined path and its lower edge is engaged by a retainer bar 240 attached by screws 241 to the frame 210. This construction permits removal of any segment which, upon inspection, may appear defective. Obviously the segments fall from the chutes 80 into the rack carriages and racks while the carriage is at rest or during the three-quarter turn period of the drum 212 in which the retainer plate 222 is operative and the cam 211 is out of operative relation with the rack carriage pegs 220. In other words, while the rack carriage is at rest, a segment 25 falls from each of the chutes 80 into the segment spaces 208 and 208' which are vertically below the channels provided by the channel bars 225. Those segments which are still in the chutes cannot fall down because they are retained by the segments which are in the rack carriage and rack, these segments being supported vertically by the retainer plate 240. After the carriage 204 has moved to the left, a distance equal to the spacing of the carriage and rack teeth, one more segment will fall from each chute into position upon the rack carriage and rack. By providing two chutes it is obvious that the rack will be filled in one-half the time required to fill it if only one chute were employed.

After each segment passes from the chute to the rack carriage and before the carriage is moved again toward the left, the segment which has just been received by the carriage and any segments immediately adjacent to the left thereof, are struck a light blow by a packer bar 242 attached by screws 243 to the right angle extension 244 of a lever 245 carrying a weight 246 secured by screw 247. The lever 245 is attached to a hub 248 which is mounted upon a rod 249 supported by brackets 250 and 251 which are attached by screws 252 to the frame 210. The rod 249 has a head 253 and is retained by a cotter pin 254 passing through a hole adjacent the end of the rod 249 which extends through the bracket 251. The lever 245 is retained from movement along the rod 249 by a spacer 255, a spacer 256 and a hub 257 carrying a lever 258. The hub and levers 257 and 258 are also loosely mounted upon the rod 249 and the free end of the lever 258 is engageable with a cam 260 provided by a cylindrical disc having a flat portion at 261. The disc 260 is attached to the hub 262 which is secured by a set screw in adjusted position to the shaft 116. A spring 264 located between the lever 258 and the frame 210 yieldingly urges the lever 258 toward the cam 260. Motion is transmitted from the lever 258 to the lever 245 and hence to the packer bar 242 through a radial surface 265 provided by the lever 258 and engageable with a pin 266 carried by the lever 245. The arcuate surface 267 provided by the lever 258 clears the pin 265. The cam 260 is so located on the shaft 116 that the cylindrical portion of the cam 260 will engage the lever 258 during the time in which the carriage is moved along and also during that portion of the rest period of the carriage required for the dropping of a segment from the chute 80 in the position upon the carriage and rack. Then just after the segment has passed upon the rack the flat portion 261 of the cam 260 will be presented to the lever 258 so that the lever may be quickly moved by the spring 264 in a clockwise direction to permit the lever 245 to move in the same direction so that the packer bar 242 may tap the segments a light blow in order to insure that the segments are forced down into the spaces between the rack teeth. The force of the blow exerted by the packer bar 242 will of course depend somewhat on the mass of weight 246.

The number of rack carriage pegs 220 is such that when all of the rack spaces have received segments the carriage 204 will not move any further toward the left although the cam 211 continues to rotate. Before the removable rack 201 filled with segments can be removed from the rack stacker, those segments which are still in the chutes must be locked against gravitating down the chutes while the filled rack is removed. Means are therefore provided for locking in the lowest segments 25, this means comprising a bar 270 which slides longitudinally in a groove 271 provided by the frame 210 and is retained therein by the guide blocks 230. The bar 270 is operated by a handle 272 passing through a slot 273 in the frame 210 and screw-threaded into the bar 270. The bar 270 is provided with a notch 274 located below each chute 80 to permit the passage of a segment 25 into the rack as shown in Fig. 19. Adjacent each notch 274 there is provided a beveled surface 275 shown in Figs. 19 and 21 which, when the knob 272 is moved toward the right, in Fig. 13, will engage the lower dovetail tang of the segment and therefore prevent the segment from falling down below the bar 270 while the filled rack is removed from the machine. Before removing the filled rack, the packer bar 242 is moved to the position indicated by the dot and dash lines 242a shown in Fig. 12. The next step is to place against the completely exposed row of commutator segments a long, shallow pan 280 shown in Fig. 1b and then grasp each end of the rack and each end of the pan between the thumb and forefinger and then remove the assembled pan and segments and rack and then invert the rack and segments upon the pan as shown in Fig. 1c, the pan serving as a means for carrying the rack and segments to the magazine of a commutator assembling machine such as shown in Poole's application, No. 183,080.

Following this operation, an unfilled rack is placed upon the carriage with the carriage locating pin within the locating hole of the rack. Then the carriage and rack are moved toward the right until a lug 281 on the right end of the rack carriage strikes a stop plate 282 attached by screws 283 to the right hand end of the frame 210. Then the packer bars 242 are placed in operating position shown in full lines in Fig. 12 and the knob 272 is moved toward the right to permit segments to fall from the chutes into the rack as described before. A stopping mechanism, to be described, which was manipulated to prevent rotation of the cam 211 while the filled rack is removed and an unfilled one replaced upon the rack carriage, is released to permit rotation of the cam 211 in order that the rack carriage 204 will be moved again by an intermittent motion toward the left.

The stopping mechanism just referred to, comprises a lever 290 pivoted upon a screw 291 fastened to the frame 210 and carrying a buffer block 292 engageable with a pin 293 carried by the drum 212. When the lever 290 is in the position shown in Fig. 13, the drum 212 cannot turn. Obviously by moving the lever 290 clockwise, the pin 293 will be free of the buffer block 292 and the drum 212 will be permitted to turn due to a friction drive between the drive pulley 115. The pulley 115 is loosely rotatable upon the shaft 116 and is urged by a spring 294 against the drum 212 so as to frictionally drive the same. The spring 294 is located between the hub of the pulley 115 and a collar 295 which is attached by a set screw 296 to the shaft 116. The shaft 116 is located endwise with respect to the brackets 215 and 216 by collars 297 secured by set screws 298, the collars bearing respectively against the bearings 213 and 214. Whenever it is desired to stop the machine before the rack is filled, the lever 290 is rotated counter-clockwise into the position shown in Fig. 13 to prevent further rotation of the drum 212 while the pulley 115 continues to rotate. Sometimes it is necessary to stop the stacking machine because the segments do not fall from the chutes sufficiently to clear the lower end of the chutes so that the rack may be moved along. It has been found desirable to provide means for moving the rack toward the right when this occurs in order to relieve a jamming condition. The manually operable means for moving the rack toward the right comprises a pair of engageable clutch members 300 and 301, the former being loosely rotatable on the shaft 116 and the latter fixed to the shaft as shown in Fig. 13. The clutch members are normally held apart by plungers 302 urged toward the right by springs 303 received by spring recesses 304 provided in the clutch member 301 and serving as guides for the plungers 302. The springs 304 urge the clutch 300 against a pan plate 305 attached by screws 306 shown in Fig. 14 to a bearing bracket 215. The plate 305 provides diametrically opposite cam ridges 307 engageable with corresponding companion notches 308 provided by the clutch 300. When the clutch 300 is turned in a counter-clockwise direction, shown in Fig. 12, by moving the operating handle 310 connected therewith, the clutch 300 will be cammed toward the left as viewed in Fig. 13 and will be caused to drivingly engage the clutch 301, thereby causing the shaft 116 to be turned in a counter-clockwise direction, or in a direction opposite to normal direction of rotation. This will cause a reverse movement of the cam 211 and the movement of the rack carriage 204 toward the right. When the operator who sits in front of the machine as viewed in Fig. 1 releases the handle 310, it will drop back into the position shown in Fig. 1 until its notches 308 match with the camming ridges 307, whereupon the springs 304 will move the clutch 300 out of engagement with the clutch 301 so that the shaft 116 may be free to turn again and operate the carriage in the usual manner after the buffer block 292 better shown in Fig. 20 has been retracted from the path of movement of the drum pin 293 by moving the lever 290 clockwise from its position shown in Fig. 13.

While the form of embodiment of the present invention, as herein disclosed, constitutes a preferred form, it is to be understood that other forms might be adopted, all coming within the scope of the claims which follow.

What is claimed is as follows:

1. Apparatus for feeding bars of material the transverse sectional thickness of which is variable, comprising in combination, a chute upon which the bars may descend in end to end relation, an ejector spaced from the chute in such manner as to form with the chute an opening, shaped so that the bars may move lengthwise through the opening only when they descend in the desired manner, and means for moving the ejector toward a bar as it descends.

2. Apparatus for feeding bars of material the transverse sectional thickness of which is variable, comprising in combination, a chute upon which the bars may descend in end to end relation, an ejector having a series of paddles each cooperating with the chute to provide an opening, shaped so that the bars may move lengthwise through the opening only when they descend in the desired manner, and means for moving the paddles of the ejector toward the bars as they descend.

3. Apparatus for feeding bars of material the transverse sectional thickness of which is variable, comprising in combination, a chute upon which the bars may descend in end to end relation, an ejector wheel having a series of paddles each cooperating with the chute to provide an opening in their position closest to the chute, shaped so that the bars may move lengthwise through the opening only when they descend in the desired manner, and means for turning the paddles about the axis of the ejector wheel toward a bar as it descends.

4. Apparatus for feeding bars of material, the transverse sectional thickness of which is variable, comprising in combination, a chute upon which the bars may descend in end to end relation, an ejector spaced from the chute in such manner as to form with the chute an opening, shaped so that the bars may move lengthwise through the opening only when they descend in the desired manner, means for moving the ejector toward a bar as it descends, an ejector for removing bars which descend sidewise and means for moving said last ejector toward a bar as it passes.

5. Apparatus for feeding bars of material the transverse sectional thickness of which is variable, comprising in combination, a chute upon which the bars may descend in end to end relation, an ejector spaced from the chute in such manner as to form with the chute an opening, shaped so that the bars may move lengthwise through the opening only when they descend in the desired manner, means for moving the ejector toward a bar as it descends, an ejector being provided with a series of teeth for engaging bars which descend sidewise, and means for moving said teeth of said last ejector toward the bars as they pass.

6. Apparatus for feeding bars of material the transverse sectional thickness of which is variable, comprising in combination, a chute upon which the bars may descend in end to end relation, an ejector spaced from the chute in such manner as to form with the chute an opening, shaped so that the bars may move lengthwise through the opening only when they descend in the desired manner, means for moving the ejector toward a bar as it descends, an ejector comprising a toothed wheel which teeth engage bars that descend sidewise, and means for turning said teeth of said wheel toward a bar as it passes.

7. Apparatus for feeding bars of material, the transverse sectional thickness of which is variable, comprising in combination, a chute upon which the bars may descend in end to end relation, an ejector having a series of paddles each cooperating with the chute to provide an opening, shaped so that the bars may move lengthwise through the opening only when they descend in the desired manner, means for moving the paddles of the ejector toward the bars as they descend, an ejector for removing bars which descend sidewise and means for moving said last ejector toward a bar as it passes.

8. Apparatus for feeding bars of material the transverse sectional thickness of which is variable, comprising in combination, a chute upon which the bars may descend in end to end relation, an ejector having a series of paddles each cooperating with the chute to provide an opening, shaped so that the bars may move lengthwise through the opening only when they descend in the desired manner, means for moving the paddles of the ejector toward the bars as they descend, an ejector being provided with a series of teeth for engaging bars which descend sidewise, and means for moving said teeth of said last ejector toward the bars as they pass.

9. Apparatus for feeding bars of material the transverse sectional thickness of which is variable, comprising in combination, a chute upon which the bars may descend in end to end relation, an ejector having a series of paddles, each cooperating with the chute to provide an opening, shaped so that the bars may move lengthwise through the opening only when they descend in the desired manner, means for moving the paddles of the ejector toward the bars as they descend, an ejector comprising a toothed wheel which teeth engage bars that descend sidewise, and means for turning said teeth of said wheel toward a bar as it passes.

10. Apparatus for feeding bars of material the transverse sectional thickness of which is variable, comprising in combination, a chute upon which the bars may descend in end to end relation, an ejector wheel having a series of paddles each cooperating with the chute to provide an opening in their position closest to the chute, shaped so that the bars may move lengthwise through the opening only when they descend in the desired manner, means for turning the paddles about the axis of the ejector wheel toward a bar as it descends, an ejector for removing bars which descend sidewise and means for moving said last ejector toward a bar as it passes.

11. Apparatus for feeding bars of material the transverse sectional thickness of which is variable, comprising in combination, a chute upon which the bars may descend in end to end relation, an ejector wheel having a series of paddles each cooperating with the chute to provide an opening in their position closest to the chute, shaped so that the bars may move lengthwise through the opening only when they descend in the desired manner. means for turning the paddles about the axis of the ejector wheel toward a bar as it descends, an ejector being provided with a series of teeth for engaging bars which descend sidewise, and means for moving said teeth of said last ejector toward the bars as they pass.

12. Apparatus for feeding bars of material the transverse sectional thickness of which is variable, comprising in combination, a chute upon which the bars may descend in end to end relation, an ejector wheel having a series of paddles each cooperating with the chute to provide an opening in their position closest to the chute, shaped so that the bars may move lengthwise through the opening only when they descend in the desired manner, means for turning the paddles about the axis of the ejector wheel toward a bar as it descends, an ejector comprising a toothed wheel which teeth engage bars that descend endwise, and means for turning said teeth of said wheel toward a bar as it passes.

13. Apparatus for feeding bars of material the transverse sectional thickness of which is variable, comprising in combination, a chute upon which the bars may descend in end to end relation, an ejector wheel having a series of paddles each cooperating with the chute to provide an opening in their position closest to the chute, shaped so that the bars may move lengthwise through the opening only when they descend in the desired manner, an ejector comprising a toothed wheel which teeth engage bars that descend endwise, means for turning the paddles of said first ejector wheel about the axis of this wheel toward a bar as it descends, and means for driving said second ejector by said first ejector toward a bar as it passes.

14. Apparatus for feeding bars of material the transverse sectional thickness of which is variable, comprising in combination, a chute, and a stationary member spaced from the chute so as to permit the bars to pass flatwise down the chute and shaped so as to divert from the chute the bars which descend other than flatwise.

15. Apparatus for feeding bars of material the transverse sectional thickness of which is variable, comprising in combination, a chute, and a stationary plate spaced from the chute and having an edge oblique to the chute so as to permit the bars to pass flatwise down the chute and to divert from the chute the bars which descend other than flatwise.

16. Apparatus for feeding bars of material the transverse sectional thickness of which is variable, comprising in combination, a chute, a stationary member spaced from the chute so as to permit the bars to pass flatwise and shaped so as to divert from the chute the bars which descend other than flatwise, an ejector which removes the bars which descend sidewise, and an ejector which removes bars descending lengthwise but not in the desired manner.

17. Apparatus for feeding bars of material the transverse sectional thickness of which is variable, comprising in combination, a hopper, means for elevating bars from the bottom of the hopper, a chute upon which the bars may descend lengthwise, means for guiding bars from the elevating means to the chute and comprising a trough which guides the bars for movement transverse to the chute and a plate which changes the direction of movement of the bars to movement lengthwise with respect to the chute, and means for ejecting from the chute all bars except those which pass lengthwise down the chute in a certain manner.

18. Apparatus for making devices from a number of bars comprising, in combination, a work holder having a series of spaced notches, a movable work holder carriage upon which a work holder may be placed for loading, and a chute for delivering the bars by gravity successively to the notches of the work holder.

19. Apparatus for making devices from a number of bars comprising in combination, a work holder having a series of spaced notches, a movable work holder carriage upon which a work holder may be placed for loading, a chute for delivering the bars by gravity successively to the notches of the work holder, and manually operable means for preventing the descent of bars from the chute when desired.

20. Apparatus for making devices from a number of bars comprising, in combination, a work holder having a series of spaced notches, a movable work holder carriage upon which a work holder may be placed for loading, a chute for delivering the bars by gravity successively to the notches of the work holder, and means for packing the bars more firmly upon the work holder.

21. Apparatus for making devices from a number of bars comprising, in combination, a work holder having a series of spaced notches, a movable work holder carriage upon which a work holder may be placed for loading, a chute for delivering the bars by gravity successively to the notches of the work holder and manually operable means for moving the work holder carriage in one direction.

22. Apparatus for making devices from a number of bars comprising, in combination, a bar receiving rack comprising a notched portion, a rack carriage supporting the rack, means for moving the carriage intermittently, in one direction, each step of motion being the spacing of the rack notches, and a chute for delivering the bars by gravity successively to the notches of the rack.

23. Apparatus for making devices from a number of bars comprising, in combination, a bar receiving rack comprising a notched portion, a rack carriage supporting the rack, means for moving the carriage intermittently, in one direction, each step of motion being the spacing of the rack notches, a chute for delivering the bars by gravity successively to the notches of the rack, and manually operable means for preventing the descent of bars from the chute, so that the rack may be removed, when filled, without permitting bars to pass from the chute.

24. Apparatus for making devices from a number of bars comprising, in combination, a bar receiving rack comprising a notched portion, a rack carriage supporting the rack, means for moving the carriage intermittently, in one direction, each step of motion being the spacing of the rack notches, a chute for delivering the bars by gravity successively to the notches of the rack, and means for packing the bars more firmly upon the rack.

25. Apparatus for making devices from a number of bars comprising, in combination, a bar receiving rack comprising a series of notches, a rack carriage supporting the rack, means for moving the carriage intermittently, in one direction, each step of motion being the spacing of the rack notches, a chute for delivering the bars by gravity successively to the notches of the rack, and manually operable means for moving the rack carriage in the opposite direction.

In testimony whereof we hereto affix our signatures.

LORA E. POOLE.
JOHN Q. HOLMES.
LOUIS C. GOAD.